(12) United States Patent
Campagnolo

(10) Patent No.: US 6,412,605 B2
(45) Date of Patent: Jul. 2, 2002

(54) BICYCLE BRAKE

(75) Inventor: Valentino Campagnolo, Vicenza (IT)

(73) Assignee: Campagnolo Srl, Vicenza (IT)

(*) Notice: Subject to any disclaimer, the term of this patent is extended or adjusted under 35 U.S.C. 154(b) by 0 days.

(21) Appl. No.: 09/766,618

(22) Filed: Jan. 23, 2001

(30) Foreign Application Priority Data

Feb. 24, 2000 (IT) .......................... TO00A0179

(51) Int. Cl.[7] .............. B62L 1/10; B62L 1/06; B62L 1/12; B62L 1/16
(52) U.S. Cl. ................ 188/24.11; 188/24.12
(58) Field of Search ............ 188/24.11–24.22; 74/489, 502.2, 480 R

(56) References Cited

U.S. PATENT DOCUMENTS

| | | | |
|---|---|---|---|
| 4,064,972 A | * 12/1977 | Ohtani et al. ............ | 188/24.11 |
| 4,805,742 A | * 2/1989 | Sato et al. ............... | 188/24.11 |
| 4,838,386 A | * 6/1989 | Yoshigai .................. | 188/24.12 |
| 2001/0017244 A1 | * 8/2001 | Campagnolo ............ | 188/24.11 |

* cited by examiner

*Primary Examiner*—Douglas C. Butler
(74) *Attorney, Agent, or Firm*—Sughrue Mion, PLLC

(57) ABSTRACT

In a bicycle brake, a lever of the brake is mounted articulated on a pivot. The pivot has an end head which is received in a blind hole made in the lever and opening out on to the rear wall of the latter. The head of the pivot is axially withheld against the bottom wall of the blind hole by a bushing surrounding the pivot and screwed to a threaded portion of the aforesaid blind hole. The head is therefore not visible on the front surface of the lever.

7 Claims, 3 Drawing Sheets

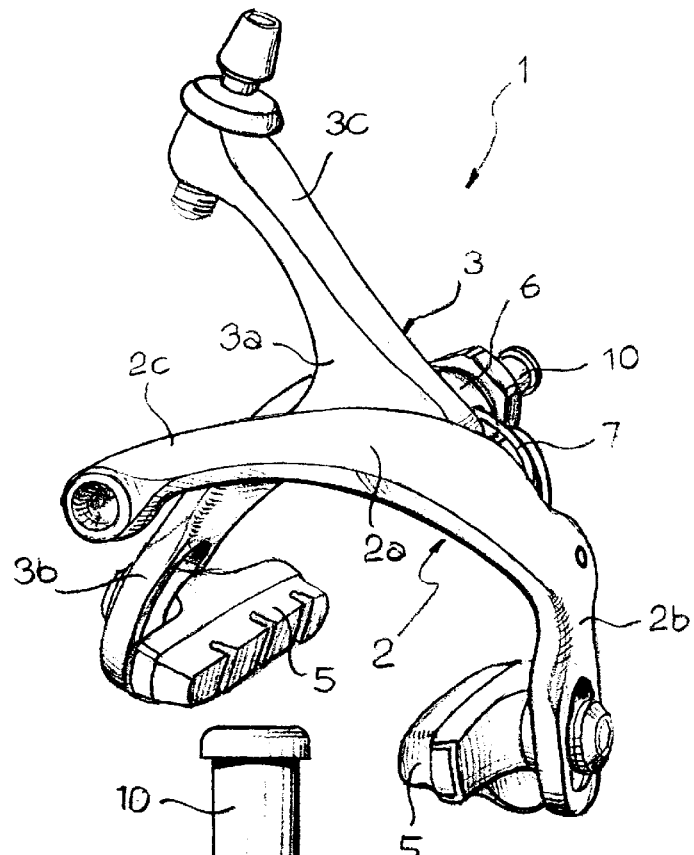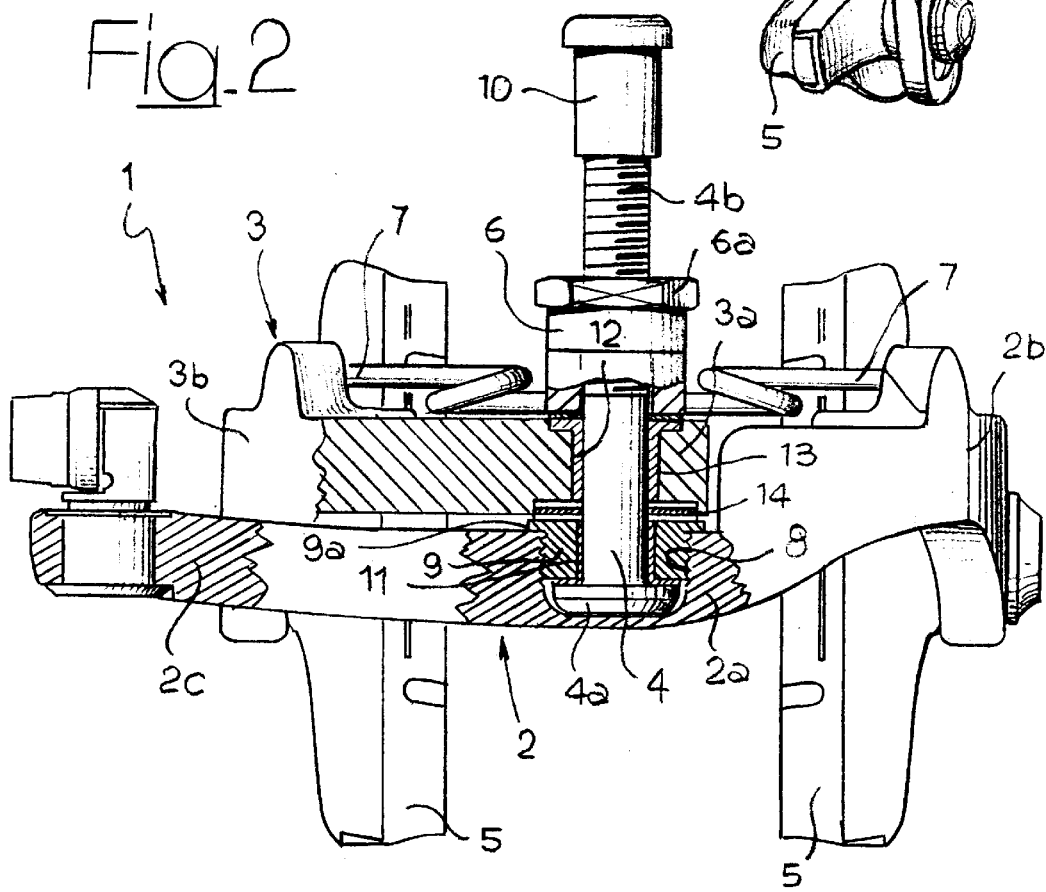

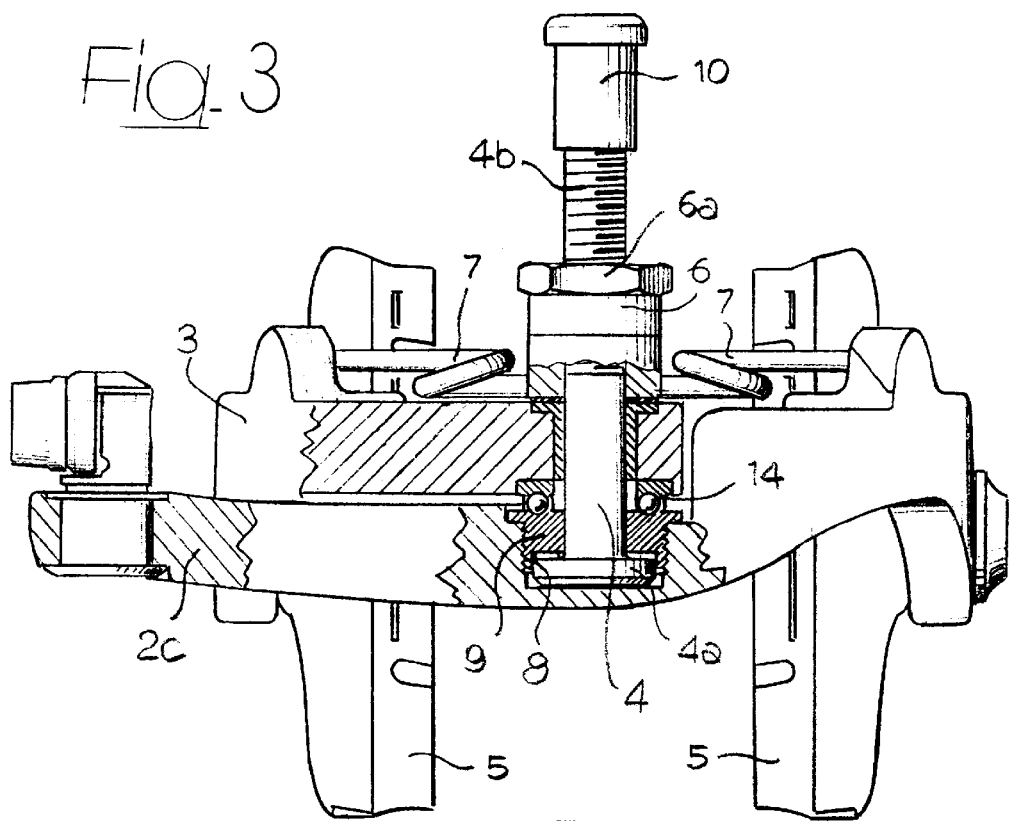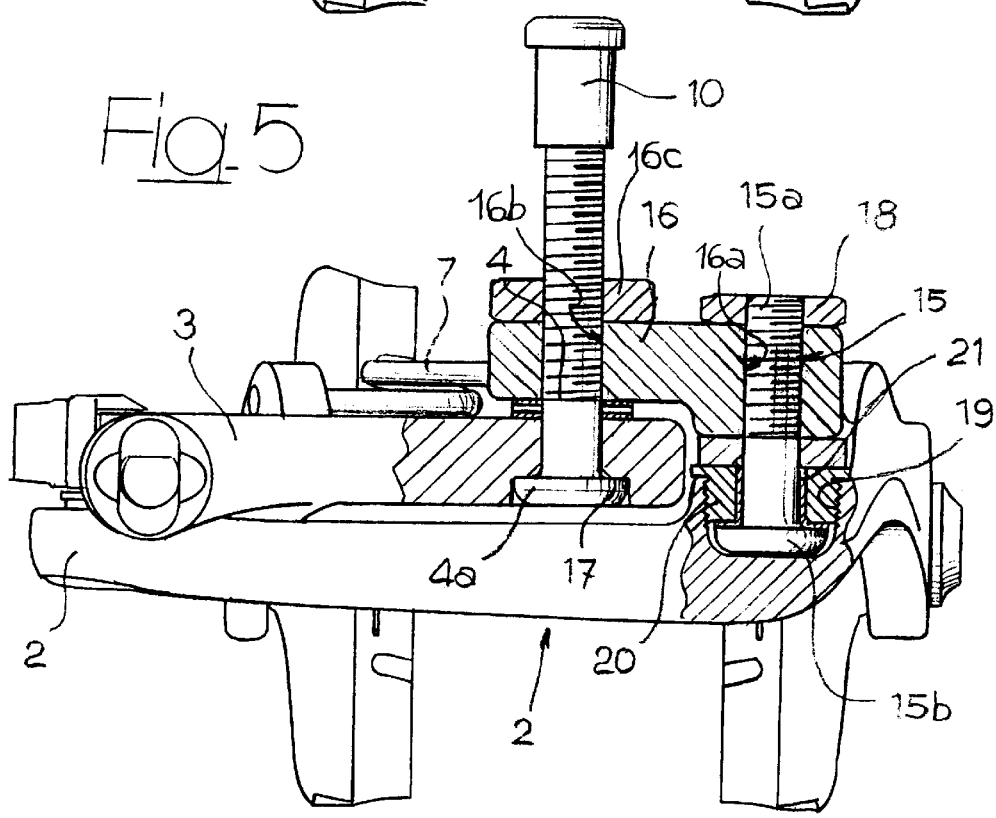

BICYCLE BRAKE

The present invention relates to bicycle brakes, of the type comprising a front lever and an internal lever, set behind the front lever, both levers (callipers) being able to oscillate and each including an articulation portion from which there extend an arm for supporting a brake shoe and an actuating arm, said levers being arranged in such a way as to cross one another, and each lever being articulated in its articulation portion on a supporting pivot. In the present description and in the claims that follow, the term "front" is used with reference to the direction of advance of the bicycle.

The invention applies both to brakes of the most conventional type in which said levers are articulated on a single common pivot designed to be secured to the frame of a bicycle and to brakes of the type in which said internal lever is mounted articulated on a first pivot designed to be secured to the frame of a bicycle, and said front lever is mounted articulated by means of a second pivot on an auxiliary supporting body rigidly connected to the first pivot (see, for example, the U.S. Pat. No. 5,425,434 of the present applicant).

According to the prior art, the supporting pivot designed to be fixed to the frame of the bicycle consists of a screw, secured to the frame by means of a nut, which traverses a through hole made in each of the two levers, in the case of a brake with single pivot, or only in the internal lever in the case of a brake with dual pivot, and which has a front end head resting against the front surface of the front lever (in the case of a single-pivot brake) or of the internal lever (in the case of a dual-pivot brake). It follows that the head of the threaded pivot is visible on the front part of the corresponding lever.

In order to hide the aforesaid head of the pivot from sight, the subject of the present invention is a brake of the type referred to at the beginning of the present description, characterized in that one of the brake levers has a blind hole that opens out on to a rear surface thereof, in which an end portion of said supporting pivot is received, said end portion of said supporting pivot being withheld axially, though free to rotate, in said blind hole.

In the preferred embodiment of the invention, the aforesaid end portion of the pivot takes the form of a widened head and is axially withheld against the bottom of the blind hole by a bushing surrounding the pivot, said bushing being screwed inside a threaded portion of said blind hole.

In the case of a single-pivot brake, the blind hole is made in the front lever and the pivot is inserted through a through hole of the internal lever. The head of the pivot is withheld axially within the blind hole of the front lever by means of the aforesaid screwed bushing. Between the rear wall of the bushing and the adjacent surface of the internal lever is preferably set an axial bearing, either a friction bearing or a rolling bearing.

In the case of a dual-pivot brake, the articulation of the internal lever to the pivot fixed to the frame may be obtained in a traditional way, i.e., by providing the pivot with a head resting on the front surface of the internal lever, in that this surface is in any case hidden by the front lever. However, even in this kind of brake, the arrangement of the invention can be adopted to provide the articulation of the front lever on the aforesaid second pivot. In this case, the second pivot is secured rigidly to the auxiliary supporting body and has a head received in a blind hole made in the rear wall of the front lever, the head being axially withheld inside said blind hole by means of a bushing screwed inside it.

Thanks to the characteristics referred to above, articulation of the brake levers is obtained with an arrangement different from those of the known art, which makes it possible to hide the head of the pivot out of sight.

Further characteristics and advantages of the present invention will emerge from the ensuing description, with reference to the attached drawings, which are provided purely to furnish a non-limiting example, and in which:

FIG. 1 is a perspective view of a brake according to the invention, of the type with single pivot;

FIG. 2 is a partially sectional top view, at an enlarged scale, of the brake of FIG. 1;

FIG. 3 illustrates a variant of FIG. 2;

FIG. 5 is a partially sectional top view, at an enlarged scale, of the brake of FIG. 4.

Figure 4:
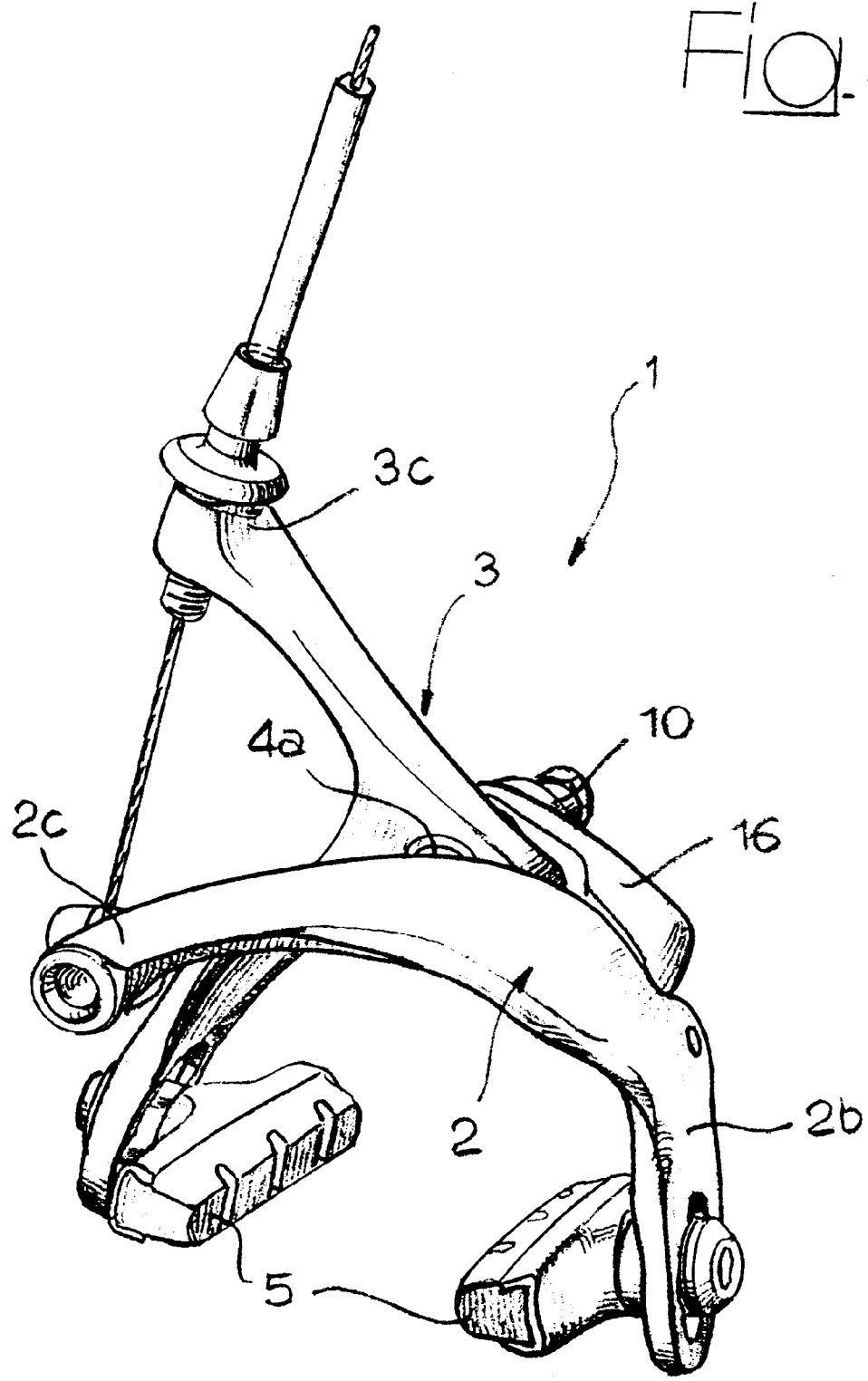
FIG. 4 is a perspective view of a brake according to the invention, of the type with dual pivot.

With reference to FIGS. 1 and 2, the number 1 designates, as a whole, a bicycle brake comprising a front lever 2 and an internal rear lever 3, set behind the lever 2, both levers being articulated on a common pivot, designated by 4 in FIG. 2. The front lever 2 has an articulation portion 2a, which is articulated on the pivot 4, and from which there extend an arm 2b for supporting a brake shoe 5 and an actuating arm 2c. Likewise, the internal lever 3 has an articulation portion 3a, from which there extend an arm 3b for supporting a brake shoe 5 and an actuating arm 3c. The ends of the actuating arms 2c, 3c are designed to be secured, respectively, and in a way of itself known, to the end of a flexible actuating cable (illustrated only in FIG. 4) and to the corresponding sheath. Actuation of the said cable causes the reciprocal approach of the two actuating arms 2c, 3c and the consequent reciprocal approach of the two brake shoes 5, which, in the condition where the brake is mounted on the frame of the bicycle, are set facing the side walls of the bicycle-wheel rim. Between the two levers 2, 3 and a bushing 6, mounted, in a way of itself known, on the pivot 4 by means of a nut 6a, two brake-shoe springs 7 are set which recall the two levers 2, 3 towards a position of maximum reciprocal distancing of the brake shoes 5.

As may be clearly seen in FIG. 1, the front surface of the front lever 2 is a continuous surface which hides the head of the pivot 4 completely from sight. In fact, as may be seen in FIG. 2, the pivot 4 has a widened head 4a which is received against the bottom surface of a blind hole 8 made in the front lever 2 and opening out on to the rear surface of said lever. The head 4a is axially withheld against the bottom of the blind hole 8 by a bushing 9 which is screwed in a threaded portion of the blind hole 8. Although the pivot 4 is axially withheld inside the blind hole 8, it is free to turn with respect to the bushing 9. Consequently, in the condition of the brake being mounted on the bicycle frame, the lever 2 is able to turn about the pivot, which is secured to the frame by means of a nut 10 screwed on a threaded end portion 4b of the pivot 4.

Preferably, set between the bushing 9 and the cylindrical stem of the pivot 4 is a further sleeve 11 made of material with a low coefficient of friction, for example plastic material.

As is also illustrated in FIG. 2, the cylindrical stem of the pivot 4 is inserted through a through hole 12 of the internal lever 3, so that also the lever 3 is mounted articulated on the same pivot 4. Preferably, and according to a technique which is in itself known, between the pivot 4 and the wall of the hole 12 there is set a sleeve 13 made of low-friction material.

As may again be seen in FIG. 2, in the case of the preferred embodiment illustrated, the bushing 9 that withholds the head 4a of the pivot has a widened end collar 9a, which bears axially upon the rear surface of the front lever 2.

Preferably, set between the rear end surface of the bushing 9 and the front surface of the lever 3 is an axial bearing 14, which in the case of FIG. 2 is of the friction type.

FIG. 3 illustrates a variant of FIG. 2 which differs from the latter only in that the bearing 14 is of the rolling type.

As may be seen from the foregoing description, the device described makes it possible to build a brake of the single-pivot type in which the front head of the pivot is altogether hidden from view.

The invention may, however, be applied also to a brake of the dual-pivot type. An example of a brake of this latter type is illustrated in FIGS. 4 and 5. In the these figures, the parts that are common to those of FIGS. 1 and 2 are designated by the same reference numbers. In the case of the dual-pivot brake, the internal lever 3 is articulated on the pivot 4, which is designed to be fixed to the bicycle frame (see also FIG. 5), whilst the front lever 2 is articulated on a second pivot 15 carried by an auxiliary supporting body 16 connected to the first pivot 4. The pivot 4 is screwed in a hole 16b of the body 16 and is engaged by a locknut 16c. In this case, the internal lever 3 is mounted on the pivot 4 using traditional techniques, i.e., with the head 4a of the pivot 4 resting in a seat 17 made on the front surface of the rear lever 3. The head 4a is, in fact, in any case hidden from sight by the lever 2 set in front of it. The second pivot 15 is instead rigidly connected to the auxiliary body 16 in that it has a threaded portion 15a screwed in a threaded hole 16a of the body 16 and tightened by a locknut 18. The pivot 15 supports the front lever 2 in an articulated way by means of an arrangement similar to the one described with reference to FIG. 2. In this case, in fact, the pivot 15 has a front head 15b which is received on the bottom wall of a blind hole 19 made in the front lever 2 and opening out on to the rear wall of said lever. Also in this case, the head 15b is axially withheld against the bottom wall of the blind hole 19 by means of a bushing 20 screwed into the hole 19 and shaped as already described with reference to FIG. 2. Also in this case, a sleeve 21 is provided made of a material with a low friction coefficient, the said sleeve 21 being set between the pivot 15 and the bushing 20. It should be noted that in dual-pivot brakes of a known type, the pivot 15 does not have in any case a head that is visible on the front part of the lever 2 in so far as the said pivot, in the aforesaid known solutions, consists of a rear projection of the lever that is rigidly connected to the latter and is mounted in such a way that it is able to turn with respect to the auxiliary supporting body 16. With the arrangement illustrated in FIG. 5, it is possible to set the pivot 15 fixed with respect to the body 16 and in such a way that it can turn with respect to the lever 2, continuing to prevent the head of the pivot from being visible on the front part of the lever.

Obviously, there is nothing to rule out in the case of the arrangement of FIG. 5 also the head 4a of the pivot 4 being received within a blind hole of the lever 3, as has already been described.

Of course, without prejudice to the principle of the invention, the details of construction and the embodiments may be varied widely with respect to what is described and illustrated herein.

In this connection, falling, for example, within the scope of the invention are variants which envisage making the blind hole described above as a through hole and obstructing one end of said hole by means of an element added to the lever in which the hole is made.

What is claimed is:

1. A bicycle brake comprising a front lever and an internal lever set behind said front lever, the said levers being able to oscillate, and each one including an articulation portion from which there extend a supporting arm for a brake shoe and an actuating arm, said levers being arranged in such a way as to cross one another, each lever being articulated in its own articulation portion on a supporting pivot, wherein one of said levers has a blind hole which opens out on to a rear surface thereof, in which an end portion of said supporting pivot is received, said end portion of the pivot being axially withheld, but free to rotate, within said blind hole.

2. A bicycle brake according to claim 1, in which said front lever and said internal lever are articulated on a single common pivot designed to be secured to the frame of a bicycle, wherein the front lever has the aforesaid blind hole, and the internal lever has a through hole traversed by the pivot.

3. A bicycle brake according to claim 1, in which the internal lever is mounted articulated on a first pivot designed to be secured to the frame of a bicycle, and the front lever is mounted articulated by means of a second pivot on an auxiliary supporting body rigidly connected to the first pivot, wherein said front lever has the aforesaid blind hole which receives, within it, so that it is able to turn, an end portion of said second pivot, said second pivot being rigidly connected to said auxiliary supporting body.

4. A bicycle brake according to claim 1, wherein said end portion of the pivot which is received within the aforesaid blind hole is in the form of a widened head and is axially withheld against the bottom of the blind hole by a bushing surrounding the pivot and screwed into a threaded portion of said blind hole.

5. A bicycle brake according to claim 4, in which the two levers are mounted on a common pivot, wherein set between the rear end of the bushing and the rear lever is an axial bearing.

6. A bicycle brake according to claim 5, wherein the aforesaid axial bearing is a friction bearing.

7. A bicycle brake according to claim 5, wherein the aforesaid axial bearing is a rolling bearing.

* * * * *